UNITED STATES PATENT OFFICE.

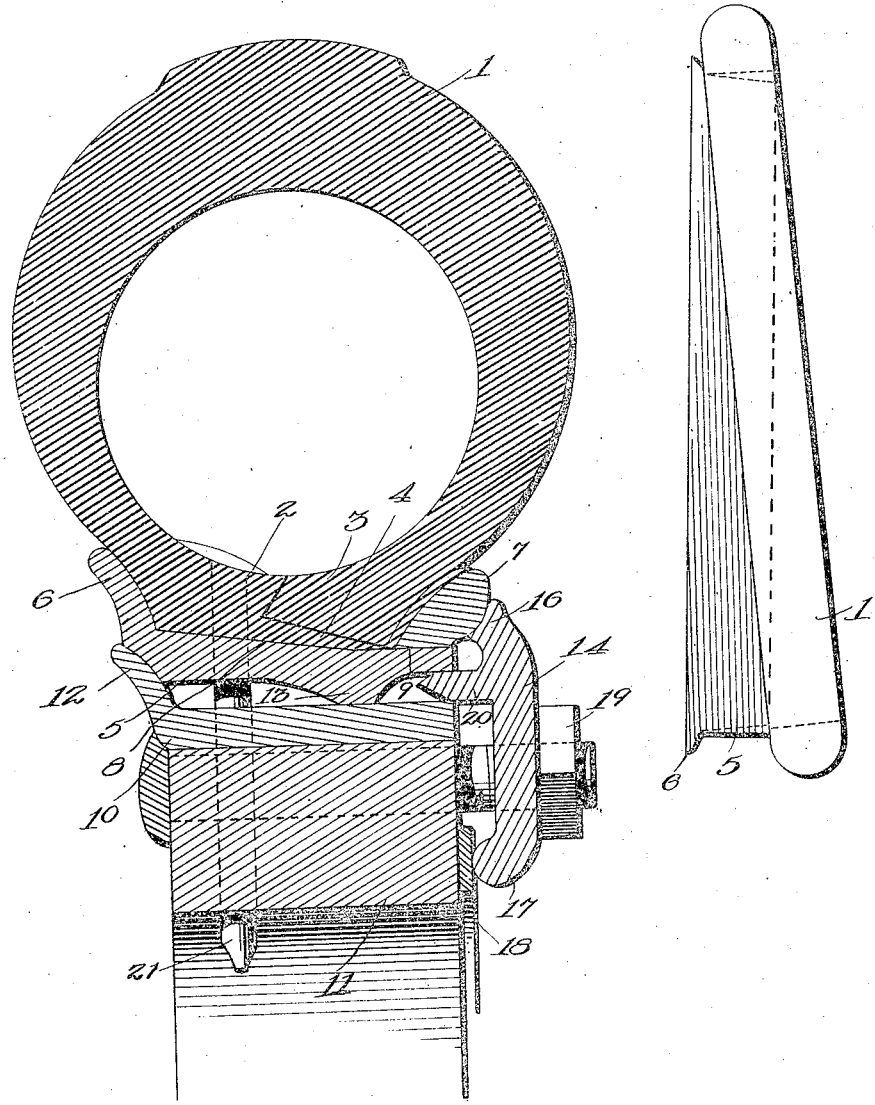

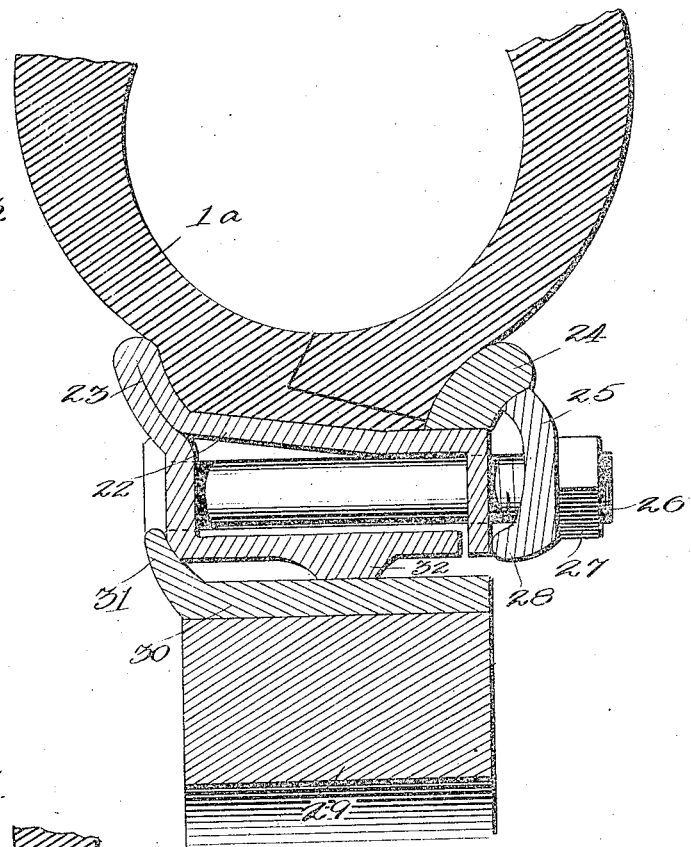
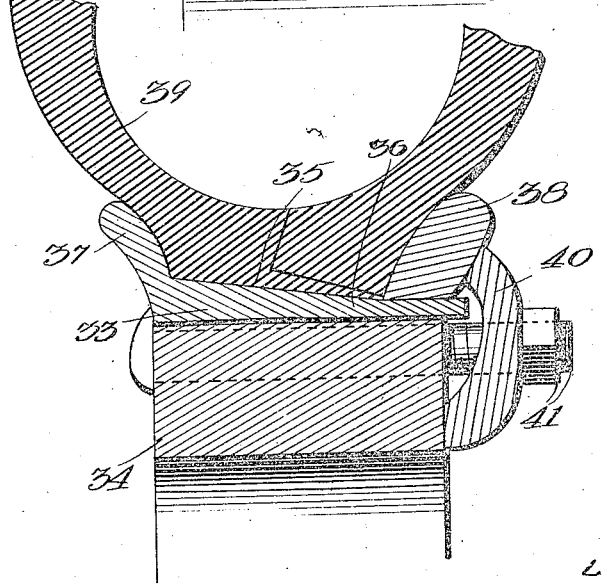

LOUIS JAY PERKINS, OF LEWISTON, IDAHO.

TIRE-MOUNTING.

1,398,566.	Specification of Letters Patent.	Patented Nov. 29, 1921.

Application filed November 28, 1919. Serial No. 341,118.

*To all whom it may concern:*

Be it known that I, LOUIS JAY PERKINS, a citizen of the United States, and a resident of Lewiston, in the county of Nez Perce and State of Idaho, have invented certain new and useful Improvements in Tire-Mountings, of which the following is a specification.

My invention is an improvement in tire mountings, and has for its object to provide a mounting of the character specified adapted for use in motor vehicles of any character, wherein the edges of the shoe or casing are so arranged that they may be pressed tightly together to seal the casing, and wherein means is provided in connection with the rim for securely clamping the said edges together.

In the drawings:

Figure 1 is a radial section of a wheel having the improved tire mounting;

Fig. 2 is an edge view showing the manner of placing the tire;

Figs. 3 and 4 are views similar to Fig. 1, showing modified constructions.

In all of the embodiments shown the shoe or casing 1 may be of any usual or desired formation, but the edges thereof are adapted to abut and to be clamped together to seal the shoe or casing. The edges 2 and 3 of the tire have their abutting faces meeting at an incline as shown, and the edge 2 has a flap 4 which is adapted to underlie the edge 3.

This flap 4 is triangular in cross section as shown, the opposite faces meeting at an acute angle, and the upper face is inclined, inclining downwardly from the abutting surface above mentioned to the free edge of the flap. That face of the edge 3 which abuts the upper face of the flap is inclined to fit, and it will be noticed that the abutting face of the wall 2 is undercut, the arrangement being such that the more firmly the edges are pressed toward each other the more closely they will engage at the abutting faces.

Because of this construction any force which tends to press the edges together assists in sealing the tire, and the improved tire may be used with demountable rims or with wheels not provided with such rims. In Fig. 1 the tire is shown in connection with a demountable rim. In this construction the rim 5 has at one side edge a flange 6 for engaging the shoe at the edge 2, and the other edge of the tire is engaged by a retaining ring 7 which is held on the demountable rim by clamps to be described.

Referring to Fig. 1, it will be seen that the peripheral surface of the demountable portion 5 of the rim is conical throughout something like two-thirds of its width, as indicated at 8, the remaining surface 9 being cylindrical. The smallest diameter of the tapering portion is internal or inward, merging with the cylindrical surface 9. The inner surface of the shoe as a whole is shaped to fit this tapering surface 8 of the demountable portion of the rim, and a portion of the cylindrical surface 9, and a retaining ring 7 fits on this cylindrical surface, so that the ring does not become tighter as it is moved inward toward the flange 6. Thus by means of the ring 7 the edges 2 and 3 of the shoe may be tightly clamped together.

The rim 10 of the wheel which is fixed is seated on the felly 11, and 10, which is cylindrical, has at one side edge an outwardly extending flange 12. The demountable rim 5 has on its inner surface and at the junction of the tapering and cylindrical portions an annular rib 13 which is adapted to engage the outer surface of the rim 10, and the flanged or large side of the demountable rim engages the flange 12. This rim and the rib 13 are so proportioned that the shoe or casing will be supported in the proper position with respect to the wheel.

The clamping mechanism for forcing the retaining ring into place and holding it there consists of a series of plates 14, each of which has an opening intermediate its ends for receiving a bolt 15, which passes through the felly adjacent to the rim 10. Each end of the plate has a laterally bent portion, as shown at 16 and 17, respectively, the said portions extending in the same direction, one being adapted to engage the retaining ring and the other a reinforcing or facing ring 18 on the side face of the felly.

It will be obvious that when the nut 19 is turned on the bolt the angularly bent portion or lug 16 will drive the retaining ring inward, to tightly clamp the edges 2 and 3 of the shoe together. Each of the clamps 14 has a laterally extending lug 20 on its inner face, adjacent to the lug 16, which fits between the demountable portion of the rim 5 and the fixed portion, and each of these lugs 20 is beveled at its end, as shown, to facilitate its entrance between the two portions of the rim. The shoe or casing has the usual air valve 21 for permitting it to be inflated, the said valve extending through the rim and felly, as shown.

In Fig. 3 is shown a construction of demountable rim suitable for carrying a spare tire. In Fig. 1 the demountable portion of the rim could not be used for carrying the spare tire because of the fact that the clamping mechanism must coöperate with the felly. In the construction of Fig. 3 the shoe or casing 1ᵃ is precisely the same as that shown in Fig. 1. The demountable portion of the rim is a hollow casing indicated at 22, formed in the present instance by bending a strip of suitable material into shape, and this demountable portion has at one edge an outwardly extending flange 23. The peripheral surface of the casing is composed of tapering and cylindrical portions like the surfaces 8 and 9 of Fig. 1, and the shoe or casing is clamped against the flange 23 by a retaining ring 24. This ring is moved into position and there held by clamping plates 25, which are held by bolts 26 passing through the casing 22 and engaged by nuts 27.

Each of these plates 25 has a lug 28 at its lower end which engages the adjacent face of the casing 22 and the upper end is curved inwardly, to engage the ring 24. The wheel, whose felly is indicated at 29, carries the rim 30 having at one edge the flange 31, and the casing has the rib 32 on its under face corresponding to the rib 13 of Fig. 1. The clamping plates 25 coöperate with the rim casing 22 and not with the felly, so that when the demountable rim casing is removed from the wheel the shoe or casing is still clamped thereon.

In Fig. 4 is shown a construction adapted for rims of any character. With this arrangement the rim 33 is mounted upon the felly 34 and this rim has its peripheral surface shaped to correspond with the peripheral surface of the demountable rim 5, that is, it has a tapering surface 35 and a cylindrical surface 36. At the portion of the surface 35 of greatest diameter there is a flange 37 and a retaining ring 38 moves on the cylindrical portion of the rim 33, the edges of the shoe or casing 39 being clamped between the retaining ring and the flange. The retaining ring is held by clamping plates 40 similar to the plates 25, and the plates are held by bolts and nuts 41.

In assembling the mounting, the shoe or casing is placed upon the rim, whether that shown in Figs. 1 and 2 or that shown in Fig. 3, and the retaining ring is placed on the cylindrical portion of the rim. In the Fig. 3 construction the retaining ring may be clamped in place on the demountable rim and the shoe or casing may be inflated.

In the Figs. 1 and 4 constructions the shoe must be assembled on the wheel. After the edges of the shoe are clamped together the shoe may be inflated in the usual manner. There is no trouble in placing the shoe on the rim since it slips on easily from the small side.

In practice, the edges of the casing may be cemented just before the casing is put on, or a strip of green rubber may be placed between the flap and the under part of the edge of the casing, and then vulcanized, both arrangements making the casing air-tight. The casing is made like other casings, and the cement or strip of green rubber is placed just before the casing is put on the wheel.

I claim:

In combination, a wheel including a felly and a removable rim for the tires of vehicle wheels having tire casings, comprising a base section arranged on said felly and including an inclined portion adapted to seat the tire casing, and a flat portion, a tire retaining flange integral with the inclined portion of the base section, a tire retaining ring slidably mounted on the flat portion of the base section and adapted to engage the tire casing, and means for maintaining said ring in operative position on said flat portion comprising a series of clamping plates having offset ends fulcrumed on the felly of the wheel and engaged with the retaining ring, and nuts and bolts carried by the felly and urging said clamping plates into operative engagement with said retaining rings.

LOUIS JAY PERKINS.